Patented June 10, 1947

2,421,903

UNITED STATES PATENT OFFICE 2,421,903

PROCESS OF MAKING TRIGLYCOL DICHLORIDE

Joseph C. Patrick, Morrisville, Pa., assignor to Thiokol Corporation, Trenton, N. J., a corporation of Delaware No Drawing. Application December 4, 1944, Serial No. 566,640

4 Claims. (Cl. 260—615)

This invention relates to a process of making B-chloroethyl-B'-chloro ethoxy ethyl ether, sometimes referred to as triglycol dichloride, and also referred to as chloroethyl chloro ethoxy ethyl ether $$(Cl.CH_2CH_2.O.CH_2CH_2.O.CH_2CH_2.Cl)$$

It has been found that this compound is useful for a number of purposes including use as raw material for the manufacture of polysulfide polymers and derivatives thereof and as a plasticizer. It has also been proposed to employ it in lubricants for use in high pressure lubrication.

It is one of the products formed in the reaction between ethylene, chlorine and water. This reaction is described by Carius in Liebig's Annalen, vol. 126, page 197 (1863) and referred to in Beilstein, vol. 1, 1918 edition, published by Julius Springer, page 337. In this reaction a number of products are formed including ethylene chlorohydrin, ethylene chloride, B,B' dichloroethyl ether and triglycol dichloride and higher homologues thereof. The yield of triglycol dichloride in this reaction is however quite low.

The utility of triglycol dichloride is so substantial that it has become desirable to devise a process whereby that yield can be increased with a consequent reduction in cost not only of triglycol dichloride but also of products made therefrom.

It is therefore an object of the present invention to provide an improved process for making triglycol dichloride as well as the higher homologues which are also useful.

In accordance with the present invention, the Carius reaction is carried out, i. e., a reaction is effected between chlorine, ethylene and water with, however, an important modification. It has been discovered that if B,B' dichloroethyl ether is added to the reactants or otherwise included in the reaction mixture, preferably maintaining the pH between about 7 and 3, e. g., by using suitable buffer material, that the yield of triglycol dichloride and its higher homologues is greatly increased. In fact, the increase may be as much as 10 fold or more. The particular manner of adding or including the B,B' dichloroethyl ether may be varied widely, and in the light of the present invention, those skilled in the art will be able to readily devise numerous variations and refinements in both the process and apparatus for practicing the invention. It may all be added at the beginning or added gradually or intermittently during the reaction, i. e., in several installments. The proportion to be added may also be varied very widely. An approximate minimum proportion is about 2% by weight of the aqueous phase. This minimum proportion may advantageously be increased many fold above this lower approximate limit. Another way of stating the proportion to be added is to state that the dichloroethyl ether is added in an amount sufficient to provide an excess over the amount that dissolves in the aqueous phase, this being about the amount of said ether normally formed. The only maximum limitation on said proportion is one governed by convenience because when the reaction has been completed, it is necessary to separate the triglycol dichloride either as such or with its higher homologues from the added dichloroether and other products.

As above mentioned, in accordance with the invention the pH of the reaction is preferably maintained at about 7 to 3 for which purpose a buffer or antacid material may be employed. This may be a substantially insoluble salt of a strong base and a weak acid having a dissociation constant of the general order of carbonic acid, e. g., calcium carbonate or magnesium carbonate, strontium carbonate, barium carbonate and in general carbonates of the alkaline earth metals as such or in various forms, e. g., commercial limestone, by-product whiting. Sulfides of the alkaline earth metals may also be used. The purpose of the buffer material is to neutralize the hydrochloric acid which is formed in the reaction and to maintain the pH of the reaction in a range of approximately 7 to 3. A generic definition of the buffer material is one capable of maintaining the pH of the reaction mixture at about 7 to 3. A sufficient excess of the buffer material is preferably present at all times to accomplish this purpose and, in fact, a very large excess may be employed if desired, e. g., the reaction may be carried out continuously in a tower packed with limestone, for example, in which the ethylene and chlorine pass upwardly through the tower countercurrent to a descending stream of water. In such continuous process, the dichloroethyl ether may be added at the top of the tower and passed downwardly countercurrent to the ascending mixture of chlorine and ethylene. The reaction may also be carried out by the batch process. The temperature of the reaction is subject to considerable variation as for example, from about 0° C. to 100° C., preferably between about 15° C. and 50° C. Good results have been obtained by maintaining the temperature of the reaction at about ordinary atmospheric room temperatures. The temperature of the reaction appears not to be critical and it is possible to carry it out even above 100° C.

Purely for the sake of illustration the following specific example will be given, it being clearly understood that the invention is not limited to the details thereof.

Example

To 1000 ml. of water contained in a 2000 mol. graduated cylinder was added 200 grams of finely divided calcium carbonate and 100 ml. (122.2 grams) of dichloro diethyl ether. Chlorine and ethylene gases were bubbled in through suitable diffusion cells at such a rate that no substantial volume of gases escaped from the upper layer of the liquid. The temperature was maintained between 60° and 70° F. by cooling the cylinder in an ice bath. The streams of gases were stopped when all of the calcium carbonate had gone into solution at which time the pH was approximately 5.0, the initial pH having been about 7. The reaction mixture was allowed to settle and the oil layer and aqueous layer were separated. The oil layer (305 cc.) was subjected to fractional distillation, and thereby separated into its components which were ethylene dichloride, ethylene chlorhydrin, dichloroethyl ether, triglycol dichloride and higher homologues thereof. The aqueous layer was then subjected to distillation and ethylene chlorhydrin distilled over leaving a residue of an aqueous solution of calcium chloride. The organic products obtained and the amounts thereof are shown in the following table.

| Product | Weight in Grams |
| --- | --- |
| Ethylene dichloride | 119.3 |
| Ethylene chlorhydrin | 169.9 |
| Dichloroethyl ether | 33.6 |
| Triglycol dichloride | 22.1 |
| Higher homologues | 21.9 |
| Total weight of produce | 366.8 |
| Less added dichloroether | 122.2 |
| Net total yield | 244.6 |

The yields of triglycol dichloride and also of its higher homologues are conveniently and significantly computed on the basis of the ratio of said yields to the total weight of organic products obtained or produced, and it will therefore be seen that the percentage yield of triglycol dichloride on this basis was 9.04 and that of the higher homologues is about 8.95. A control test similar in all respects to the one above described but omitting the dichloroethyl ether showed a yield of triglycol dichloride of only 0.95% computed on the same basis.

It appears that a portion of the added B,B' dichlor diethyl ether is transformed into triglycol dichloride.

What is claimed is:

1. Process of making triglycol dichloride which comprises reacting ethylene, chlorine and water and adding to the reaction mixture a proportion of B,B' dichloroethyl ether equal to at least about two per cent by weight of the water.

2. Process of making triglycol dichloride which comprises reacting ethylene, chlorine and water and adding to the reaction mixture a proportion of B,B' dichloroethyl ether equal to at least about two per cent by weight of the water, and carrying out the reaction within a pH range of about 7 to 3.

3. In the reaction between ethylene, chlorine and water whereby products including B,B' dichloroethyl ether and triglycol dichloride are formed, the improvement which comprises maintaining an excess of B,B' dichloroethyl ether over the amount that dissolves in the aqueous phase, this being about the amount normally formed, by adding B,B' dichloroethyl ether to the reaction mixture in an amount sufficient to maintain said excess.

4. In the reaction between ethylene, chlorine and water whereby products including B,B' dichloroethyl ether and triglycol dichloride are formed, the improvement which comprises maintaining an excess of B,B' dichloroethyl ether over the amount that dissolves in the aqueous phase, this being about the amount normally formed, by adding B,B' dichloroethyl ether to the reaction mixture in an amount sufficient to maintain said excess, and also maintaining pH conditions within the range of about 7 to 3.

JOSEPH C. PATRICK.

REFERENCES CITED

The following references are of record in the file of this patent:

UNITED STATES PATENTS

| Number | Name | Date |
| --- | --- | --- |
| 2,017,811 | Cox | Oct. 15, 1935 |
| 2,352,745 | Toussaint | July 4, 1945 |

FOREIGN PATENTS

| Number | Country | Date |
| --- | --- | --- |
| 456,278 | Great Britain | Nov. 2, 1936 |
| 438,271 | Great Britain | Nov. 7, 1935 |